(12) United States Patent
Fox et al.

(10) Patent No.: US 9,539,532 B2
(45) Date of Patent: Jan. 10, 2017

(54) AIR FILTER WITH SORBENT PARTICLES

(75) Inventors: Andrew R. Fox, Oakdale, MN (US); Jonathan M. Lise, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 256 days.

(21) Appl. No.: 13/520,693

(22) PCT Filed: Jan. 13, 2011

(86) PCT No.: PCT/US2011/021095
§ 371 (c)(1),
(2), (4) Date: Jul. 5, 2012

(87) PCT Pub. No.: WO2011/088185
PCT Pub. Date: Jul. 21, 2011

(65) Prior Publication Data
US 2012/0272829 A1    Nov. 1, 2012

Related U.S. Application Data

(60) Provisional application No. 61/295,890, filed on Jan. 18, 2010.

(51) Int. Cl.
| | | |
|---|---|---|
| *B01D 46/10* | (2006.01) | |
| *B01D 39/16* | (2006.01) | |
| *B01D 46/00* | (2006.01) | |
| *B01D 46/52* | (2006.01) | |
| *B01J 20/10* | (2006.01) | |
| *B01J 20/18* | (2006.01) | |
| *B01J 20/20* | (2006.01) | |
| *B01J 20/28* | (2006.01) | |

(52) U.S. Cl.
CPC ............ *B01D 46/10* (2013.01); *B01D 39/163* (2013.01); *B01D 46/0001* (2013.01); *B01D 46/0032* (2013.01); *B01D 46/0036* (2013.01); *B01D 46/521* (2013.01); *B01J 20/10* (2013.01); *B01J 20/18* (2013.01); *B01J 20/20* (2013.01); *B01J 20/2804* (2013.01); *B01J 20/28011* (2013.01); *B01J 20/28028* (2013.01); *B01D 2239/0407* (2013.01); *B01D 2239/0435* (2013.01); *B01D 2239/0654* (2013.01); *B01D 2239/10* (2013.01)

(58) Field of Classification Search
None
See application file for complete search history.

(56) References Cited

U.S. PATENT DOCUMENTS

| 2,988,469 A | 6/1961 | Watson |
| 3,615,995 A | 10/1971 | Buntin |

(Continued)

FOREIGN PATENT DOCUMENTS

| EP | 1 059 106 | 12/2000 |
| WO | WO 2007076552 A2 * | 7/2007 |
| WO | 2009-103556 | 8/2009 |

OTHER PUBLICATIONS

Translation of WO2007076552A2, accessed Aug. 7, 2014.*

(Continued)

*Primary Examiner* — Duane Smith
*Assistant Examiner* — Phillip Shao

(57) ABSTRACT

An air filter for use in a residential HVAC system includes filtration media including a base layer and a sorbent layer including adhesive fibers and sorbent particles.

16 Claims, 2 Drawing Sheets

(56) References Cited

U.S. PATENT DOCUMENTS

| | | |
|---|---|---|
| 3,801,400 A | 4/1974 | Vogt |
| 3,971,373 A | 7/1976 | Braun |
| RE30,782 E | 10/1981 | van Turnhout |
| RE31,285 E | 6/1983 | van Turnhout |
| 4,429,001 A | 1/1984 | Kolpin |
| 4,469,734 A | 9/1984 | Minto |
| 4,588,537 A | 5/1986 | Klaase |
| RE32,171 E | 6/1986 | van Turnhout |
| 4,657,802 A | 4/1987 | Morman |
| 4,681,801 A | 7/1987 | Eian |
| 4,741,949 A | 5/1988 | Morman |
| 4,797,318 A | 1/1989 | Brooker |
| 4,798,575 A | 1/1989 | Siversson |
| 4,798,850 A | 1/1989 | Brown |
| 4,868,032 A | 9/1989 | Eian |
| 4,948,639 A | 8/1990 | Brooker |
| 4,976,677 A | 12/1990 | Siversson |
| 5,033,465 A | 7/1991 | Braun |
| 5,035,240 A | 7/1991 | Braun |
| 5,147,722 A | 9/1992 | Koslow |
| 5,328,758 A | 7/1994 | Markell |
| 5,332,426 A | 7/1994 | Tang |
| 5,389,175 A | 2/1995 | Wenz |
| 5,415,779 A | 5/1995 | Markell |
| 5,496,507 A | 3/1996 | Angadjivand |
| 5,569,489 A * | 10/1996 | Kasmark, Jr. ................ 427/202 |
| 5,605,746 A * | 2/1997 | Groeger .................. A62D 5/00 428/359 |
| 5,720,832 A | 2/1998 | Minto |
| 5,885,696 A | 3/1999 | Groeger |
| 5,952,092 A | 9/1999 | Groeger |
| 5,972,427 A | 10/1999 | Mühlfeld |
| 5,972,808 A | 10/1999 | Groeger |
| 6,024,782 A | 2/2000 | Freund |
| 6,024,813 A * | 2/2000 | Groeger et al. ............ 156/62.8 |
| 6,099,609 A * | 8/2000 | Lira et al. ...................... 55/400 |
| 6,102,039 A * | 8/2000 | Springett et al. ........ 128/206.12 |
| 6,126,707 A | 10/2000 | Pitzen |
| 6,391,429 B1 | 5/2002 | Senkus |
| 6,423,123 B1 | 7/2002 | Rosenberg |
| 6,554,881 B1 * | 4/2003 | Healey ........................... 55/528 |
| 6,802,891 B2 | 10/2004 | Kritzler |
| 6,840,986 B1 * | 1/2005 | Koslow ............................ 96/135 |
| 6,858,297 B1 | 2/2005 | Shah |
| 7,235,115 B2 * | 6/2007 | Duffy et al. ..................... 55/497 |
| 7,419,526 B2 * | 9/2008 | Greer et al. .................... 55/512 |
| 7,503,953 B2 | 3/2009 | Sundet |
| 2003/0207635 A1 * | 11/2003 | Minemura ......... B01D 39/1623 442/327 |
| 2006/0096911 A1 * | 5/2006 | Brey et al. ................. 210/500.1 |
| 2006/0265169 A1 | 11/2006 | Breister |
| 2008/0017038 A1 | 1/2008 | Wu |
| 2008/0022642 A1 * | 1/2008 | Fox et al. ....................... 55/521 |
| 2008/0026659 A1 | 1/2008 | Brandner |
| 2009/0253327 A1 * | 10/2009 | Messier ................... D04H 3/16 442/327 |
| 2009/0293279 A1 | 12/2009 | Sebastian |

OTHER PUBLICATIONS

Davies, C. N., "The Separation of Airborne Dust and Particles," Institution of Mechanical Engineers, London, Proceedings 1B, 1952, pp. 185-218.

International Search Report for PCT/US2011/021095, Mailing Date Sep. 30, 2011, 3 pages.

* cited by examiner

AIR FILTER WITH SORBENT PARTICLES

CROSS REFERENCE TO RELATED APPLICATIONS

This application is a national stage filing under 35 U.S.C. 371 of PCT/US2011/021095, filed Jan. 13, 2011, which claims priority to U.S. Application No. 61/295,890, filed Jan. 18, 2010, the disclosure of which is incorporated by reference in its/their entirety herein.

BACKGROUND

The present invention relates generally to filtration and, more particularly, to an air filter including sorbent particles.

Heating, ventilation, and air conditioning (HVAC) equipment utilizing a pressurized flow of air, for example, forced air furnaces for heating homes, are equipped with a filter to remove airborne contaminants, such as dust, debris, pollen, VOC's etc., from the air stream that passes through the filter. Suitable filters for use in these applications are commonly referred to as furnace filters, and are sold under a number of brand names. Examples of furnace filters are sold by 3M Company, St. Paul, Minn., under the trade designation Filtrete®.

Air filters including adsorbent particles are known in the prior art. U.S. Pat. No. 6,423,123 (Rosenberg et al.), for example, discloses a filter material, in particular in the form of a flat article, for fluid media, comprising a carrier layer and an adsorption layer, wherein the adsorption layer is formed by melt adhesive threads loaded with adsorber particles.

SUMMARY

The need exists for a standard residential HVAC filter with a low pressure drop, high efficiency for removing particles, and high efficiency and capacity for removing gas, vapor, and/or odor from the air. The present invention provides a residential HVAC filter containing sorbent particles for removing gas, vapor, and/or odor from the air that has a low pressure drop, high efficiency for removing particles, and high efficiency and capacity for removing gas, vapor, and/or odor from the air.

In one aspect, the present invention provides an air filter for use in a residential HVAC system that includes filtration media having opposed first and second major surfaces and a perimeter edge region with a frame arranged around at least a portion of the perimeter edge region of the media. The filtration media includes a base layer and a sorbent layer. The base layer is formed of electrostatically charged fibers and has a basis weight of about 20 to about 150 $g/m^2$. The sorbent layer includes adhesive fibers and from about 100 to about 500 $g/m^2$ of sorbent particles. The adhesive fibers comprise from about 2 to about 20 weight percent of the sorbent layer, the sorbent particles have a size of about 12 mesh to about 60 mesh, and the filter has an initial pressure drop of no greater than about 0.32 inches of water pressure as measured according to ASHRAE 52.2-2007 at a face velocity of 1.5 meters per second.

In certain more specific aspects, the filtration media may be pleated, the filtration media may have about 0.5 to about 5 pleats per 2.5 centimeters (1 inch), the electrostatically charged fibers may be formed of polypropylene, the electrostatically charged fibers may have an average effective fiber diameter of about 15 microns to about 40 microns, the sorbent layer may have a basis weight of about 100 $g/m^2$ to about 625 $g/m^2$, the sorbent layer may include from about 100 $g/m^2$ to about 500 $g/m^2$ of sorbent particles, the sorbent particles may include activated carbon, activated alumina, and/or a zeolite, the filter may include a cover web layer, the frame may be formed of paperboard, the filter may include a support structure attached to at least one of the first and second major surfaces, the support structure may be formed of glue, the glue may be generally planar and attach to the pleat tips, the support structure may be a wire mesh, the wire mesh may be generally planar, the wire mesh may generally follow the contour of the pleats, the filtration media may include fibers formed using a die that has at least one orifice of a first size and at least one orifice of a second size, wherein the size of the first orifice is at least 25% larger than the size of the second orifice, the filter may have an initial E1 particle removal efficiency as measured according to ASHRAE 52.2-2007 of at least about 10%, and/or the filter may have a media butane removal capacity of at least about 0.2 $g/m^2$ when measured according to the test method described in the specification.

In another aspect, the present invention provides an air filter for use in a residential HVAC system that includes filtration media having first and second opposed major surfaces and a perimeter edge region, and a frame arranged around at least a portion of the perimeter edge region of the media wherein the filtration media includes: (i) a fibrous nonwoven base layer, and (ii) a sorbent layer arranged adjacent the base layer, the sorbent layer comprising adhesive fibers and sorbent particles adhered to the fibers, and wherein the filter has: (i) a thickness of no greater than about 1.5 inches, (ii) an initial pressure drop of no greater than about 0.32 inches of water pressure as measured according to ASHRAE 52.2-2007 at a face velocity of 1.5 meters per second, (iii) an initial E1 particle removal efficiency as measured according to ASHRAE 52.2-2007 of at least about 10%, and (iv) a media butane removal capacity of at least about 0.2 $g/m^2$ when measured according to the test method described in the specification.

In certain more specific aspects, the filtration media may be pleated, the pleated filtration media may have about 0.5 to about 5 pleats per 2.5 centimeters (1 inch), the nonwoven base layer may have a basis weight of about 20 $g/m^2$ to about 150 $g/m^2$, the nonwoven base layer may include electrostatically charged fibers, the electrostatically charged fibers may be formed of polypropylene, the electrostatically charged fibers may have an average effective fiber diameter of about 15 microns to about 40 microns, the sorbent layer may have a basis weight of about 100 $g/m^2$ to about 625 $g/m^2$, the adhesive fibers may comprise from about 2 to about 20 weight percent of the sorbent layer, the sorbent layer may comprise from about 100 $g/m^2$ to about 500 $g/m^2$ of sorbent particles, the sorbent particles may have a size of about 12 mesh to about 60 mesh, the sorbent particles may comprise at least one of activated carbon, activated alumina, and a zeolite, the filter may comprise a cover layer, the frame may be formed of paperboard, the filter may comprise a support structure attached to at least one of the first and second major surfaces, the support structure may be formed of glue, the glue support structure may be generally planar and attach to the pleat tips, the support structure may be a wire mesh, the wire mesh may generally follow the contour of the pleats, the wire mesh may be generally planar, and/or the base layer may include fibers formed by a die that has at least one orifice of a first size and at least one orifice of a second size, and wherein the size of the first orifice is at least 25% larger than the size of the second orifice.

In yet another aspect, the present invention provides an air filter for use in a residential HVAC system that includes filtration media having opposed first and second major surfaces and a perimeter edge region, the filter media including: (i) a base layer, (ii) a sorbent layer including adhesive fibers and from about 100 to about 500 g/m$^2$ of sorbent particles, and further wherein the sorbent particles have a size of about 12 mesh to about 60 mesh; and (b) a frame arranged around at least a portion of the perimeter edge region of the media; wherein the filter has (i) an initial pressure drop of no greater than about 0.32 inches of water pressure as measured according to ASHRAE 52.2-2007 at a face velocity of 1.5 meters per second, and has (ii) an initial E1 particle removal efficiency as measured according to ASHRAE 52.2-2007 of at least about 10%.

One advantage of the filter is that is provides a high level of gas/vapor/odor removal at an acceptably low level of pressure drop.

BRIEF DESCRIPTION OF THE DRAWINGS

The present invention will be further described with reference to the accompanying drawings, in which.

DETAILED DESCRIPTION

Figure 1:
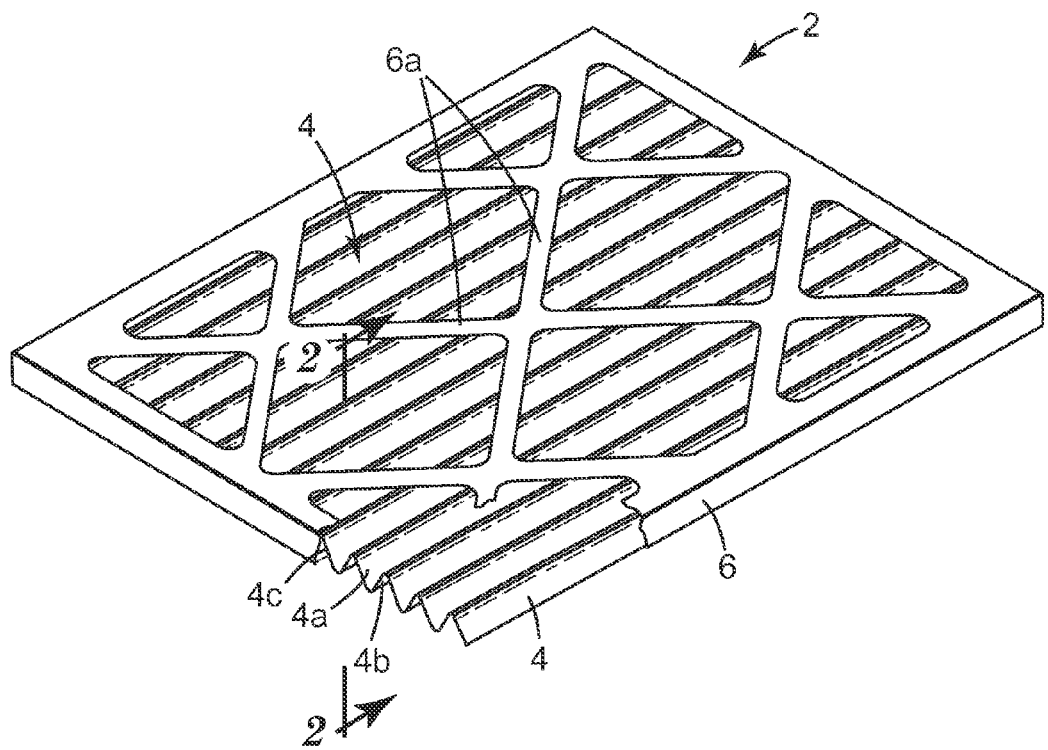
FIG. 1 is a perspective view of an air filter according to the invention.
Figure 2:
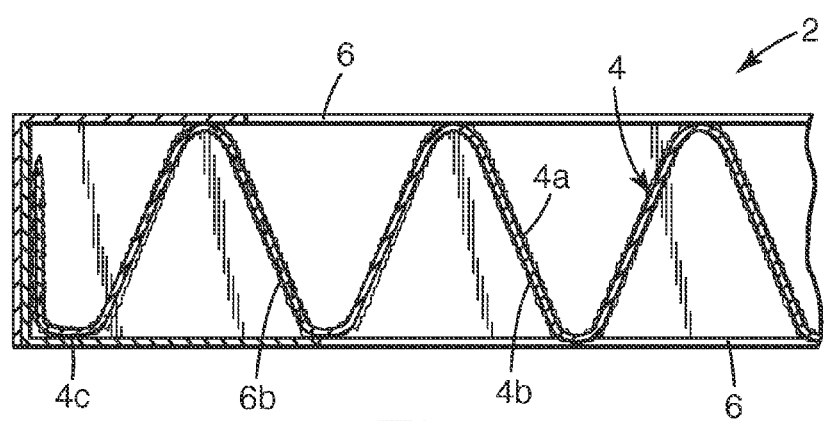
FIG. 2 is a cross sectional view taken along line 2-2 of FIG. 1.

Referring now to the drawings, wherein like reference numerals refer to like or corresponding parts throughout the several views, FIGS. 1 and 2 show an air filter 2 for use in a residential HVAC system. The air filter 2 generally includes filtration media 4 having first 4a and second 4b opposed major surfaces and a perimeter edge region 4c, and a frame 6 arranged around at least the perimeter edge region of the filtration media 4.

Figure 3:
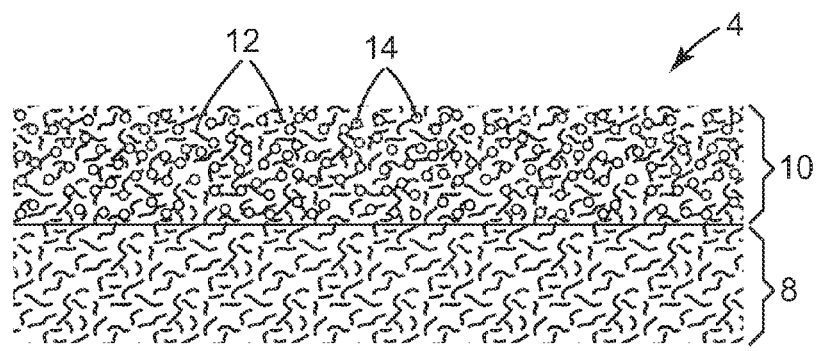
FIG. 3 is a detailed cross-sectional illustration of the air filter media in the air filter of FIG. 1.

As shown in FIG. 3, the illustrated filter media 4 includes a fibrous nonwoven base layer 8, and a sorbent layer 10 arranged adjacent the base layer 8. It will be recognized that in other embodiments, additional layers may be arranged between the base layer 8 and the sorbent layer 10. The sorbent layer 10 includes adhesive fibers 12 and sorbent particles 14 adhered to the fibers 12.

In the illustrated embodiment, the filtration media 4 is pleated. Pleat formation and pleat spacing may be performed using a variety of known techniques including those disclosed in U.S. Pat. No. 4,798,575 (Siversson), U.S. Pat. No. 4,976,677 (Siversson), and U.S. Pat. No. 5,389,175 (Wenz). In certain embodiments, the filter media 4 may include about 0.5 to about 5 pleats per 2.5 centimeters (1 inch).

In one embodiment, the fibrous nonwoven base layer 8 may be formed of polymeric fibers, such as polypropylene, using a meltblowing apparatus such as the one shown in FIG. 1 of U.S. Pat. No. 6,858,297 (Shah et al.), the entire contents of which are hereby incorporated by reference. A suitable die tip for use in connection with the meltblowing apparatus is shown in FIG. 3 of U.S. Patent Publication No. 2008/0026659 (Brandner et al.), the entire contents of which are hereby incorporated by reference. Other conventional meltblown die tips with orifices of uniform diameter may also be used to form the fibrous nonwoven base layer 8.

A particularly suitable material for forming the base layer includes FINA 3860 polypropylene having a melt flow rate index of 70 available from Total Petrochemicals, Houston, Tex., 0.8% by weight CHIMASSORB 944 available from Ciba Specialty Chemicals, now part of BASF, Florham Park, N.J., and 1.2% by weight DX820 polymethylpentene available from Mitsui Chemicals America, Rye Brook, N.Y.

In a particularly desirable embodiment, the fibrous web that forms the base layer 8 is electrostatically charged. This may be accomplished, for example, by imparting electric charge to the nonwoven fibrous web using water as taught in U.S. Pat. No. 5,496,507 (Angadjivand et al.), the entire contents of which are hereby incorporated by reference, or using water according to the techniques taught in U.S. Patent Publication No. 2009/0293279 (Sebastian, et al.), the entire contents of which are hereby incorporated by reference. In a specific embodiment, the water used to hydrocharge the base layer 8 may be deionized water. Fibrous electret webs may also be produced by corona charging as described in U.S. Pat. No. 4,588,537 (Klaase et al.), or using mechanical approaches to impart an electric charge to fibers as described in U.S. Pat. No. 4,798,850 (Brown).

Fibrous electret webs also may be produced from polymer films or foils, as described in U.S. Pat. Re. 30,782, Re. 31,285, and Re. 32,171 (van Turnhout). The polymer films or foils may be electrostatically charged before being fibrillated into fibers that are subsequently collected and processed into a nonwoven fibrous filter media.

A pre-made electrostatically charged nonwoven material suitable for constructing the base layer 8 is also available under the trade name Filtrete GDU-60, from 3M Company, St. Paul, Minn.

In one embodiment, the base layer 8 has a basis weight of about 20 g/m$^2$ to about 150 g/m$^2$. In another embodiment, the electrostatically charged fibers have an average effective fiber diameter of about 15 microns to about 40 microns.

The sorbent layer 10 may be formed using the apparatus shown in FIG. 6 of U.S. Patent Publication No. 2006/0096911 (Brey et al.), the entire contents of which are hereby incorporated by reference. U.S. Patent Publication No. 2006/0096911 discloses an apparatus for making nonwoven particle-loaded webs using a meltblowing process. To form a sorbent layer using the apparatus shown and described in U.S. Patent Publication No. 2006/0096911, a molten fiber-forming polymeric material exits a die orifice as a series of filaments, and an attenuating fluid (typically air) attenuates the filaments into fibers. Meanwhile, sorbent particles are directed into the filaments and fibers. The mixture of sorbent particles and adhesive fibers are then collected to form the nonwoven particle-loaded sorbent layer 10. Further details regarding the manner in which meltblowing would be carried out using such an apparatus will be familiar to those skilled in the art.

In one aspect, the sorbent layer has a basis weight of about 100 g/m$^2$ to about 625 g/m$^2$. In another embodiment, the adhesive fibers comprise at least about 2 weight percent, at least about 4 weight percent, and at least about 6 weight percent of the sorbent layer 10, and no greater than about 20 weight percent, no greater than about 17 weight percent, and no greater than about 15 weight percent of the sorbent layer.

In one aspect, the sorbent layer comprises at least about 100 g/m$^2$, at least about 150 g/m$^2$, and at least about 200 g/m$^2$ of sorbent particles, and no greater than about 500 g/m$^2$, no greater than about 400 g/m$^2$, and no greater than about 300 g/m$^2$ of sorbent particles.

The particular sorbent particles 14 are not critical to the invention hereof, so long as they possess the desired sorbent properties for the intended end use application for the filter. Desirably the sorbent particles will be capable of absorbing or adsorbing gases, aerosols or liquids expected to be present under the intended use conditions. The sorbent particles may be provided in any usable form including beads, flakes, granules or agglomerates. Suitable sorbent particles include activated carbon; alumina and other metal oxides; sodium bicarbonate; metal particles (e.g., silver particles) that can remove a component from a fluid by adsorption, chemical reaction, or amalgamation; particulate catalytic agents such as hopcalite (which can catalyze the oxidation of carbon monoxide); clay and other minerals treated with acidic solutions such as acetic acid or alkaline solutions such as aqueous sodium hydroxide; ion exchange resins; molecular sieves and other zeolites; silica; biocides; fungicides and virucides. Activated carbon and alumina are particularly suitable sorbent materials. Other suitable sorbent particles are disclosed in U.S. Pat. No. 3,971,373 (Braun), U.S. Pat. No. 4,429,001 (Kolpin et al.), and U.S. Pat. No. 6,102,039 (Springett et al.), the entire contents of which are hereby incorporated by reference.

The desired sorbent particle size may vary. In certain embodiments, the sorbent particles have a standard U.S. mesh size of at least about 12 mesh (1680 micrometers), at least about 16 mesh (1190 micrometers), and at least about 20 mesh (840 micrometers), and no greater than about 60 mesh (250 micrometers), no greater than about 50 mesh (300 micrometers), and no greater than about 45 mesh (355 micrometers). If the particle size of a material is described as 12×20 mesh, then 90% or more of the material will pass through a 12-mesh sieve (i.e. particles smaller than about 1680 micrometers will pass through a 12-mesh sieve) and be retained by a 20-mesh sieve (i.e. particles larger than about 841 micrometers will not pass through a 20-mesh sieve). Suitable sorbent particles include 12×20, 25×45, and 30×60 mesh sized granular activated carbon available from Kuraray Chemical Corporation, Canoga Park, Calif. Mixtures (e.g., bimodal mixtures) of sorbent particles having different size ranges may also be employed, although in practice it may be more desirable to fabricate a multilayer sheet article employing larger sorbent particles in an upstream layer and smaller sorbent particles in a downstream layer.

The particular adhesive fibers 12 are not critical to the invention hereof, so long as the adhesive fibers 12 possess the desired properties for the intended end use application for the filter 2. For example, in one desirable aspect, the adhesive fibers 12 have sufficient adhesive characteristics to bond to and hold the sorbent particles 14, and to bond the sorbent layer 10 to the base layer 8. As used herein, adhesive fibers are fibers that are sufficiently tacky during processing to allow the fibers to bond to the sorbent particles. Accordingly, adhesive fibers include preformed fibers that become tacky when heated, fibers formed of tacky materials that are formed into fibers, and nontacky preformed fibers that are coated with, for example, a pressure-sensitive adhesive.

A variety of fiber-forming polymeric materials may be used to form the adhesive fibers 12 including thermoplastics such as polyurethane elastomeric materials (e.g., those available under the trade designations IROGRAN thermoplastic polyurethane from Huntsman International, LLC, The Woodlands, Tex., and ESTANE thermoplastic polyurethane from Lubrizol Corporation, Cleveland, Ohio.), polybutylene elastomeric materials (e.g., those available under the trade designation CRASTIN from E.I. DuPont de Nemours & Co., Wilmington, Del.), polyester elastomeric materials (e.g., those available under the trade designation HYTREL from E.I. DuPont de Nemours & Co.), polyether block copolyamide elastomeric materials (e.g., those available under the trade designation PEBAX from Arkema Inc. Philadelphia, Pa.) and elastomeric styrenic block copolymers (e.g., those available under the trade designations KRATON from Kraton Polymers, Houston, Tex., and SOLPRENE from Dynasol Elastomers, Houston, Tex.). Multicomponent fibers (e.g., core-sheath fibers, splittable or side-by-side bicomponent fibers and so-called "islands in the sea" fibers) may also be used.

Particularly suitable polymeric materials include polyolefin copolymers having a melting point of from about 122° F. to about 320° F. A particularly suitable material for forming the adhesive fibers 12 is VISTAMAXX 2125 specialty elastomer available from Exxonmobil Chemical Company, Houston, Tex.

In one desirable aspect, the air filter 2 includes a frame 6. In the illustrated embodiment, the frame 6 is arranged around a perimeter edge region filter media 4. Suitable materials for the frame include chip board, or paperboard, and synthetic plastic materials. Suitable frame constructions include the "pinch" frame construction illustrated in FIGS. 1-4 of U.S. Pat. No. 6,126,707 (Pitzen), the "box" frame construction illustrated in FIGS. 5 and 6 of U.S. Pat. No. 6,126,707 (Pitzen), the hybrid frame construction illustrated in FIGS. 7-11 of U.S. Pat. No. 6,126,707 (Pitzen), any of the frame constructions disclosed in U.S. Pat. No. 7,503,953 (Sundet et al.), and any of the frame constructions disclosed in U.S. Pat. No. 7,235,115 (Duffy, et al.), the entire contents of which are hereby incorporated by reference.

In specific aspects, the frame 6 may include a reinforcing or support structure attached along the first 4a and/or second 4b major surfaces of the filter media 4. The support structure may include, for example, mesh, scrims, screens, or elongated strips, strands, or filaments of material. Such support structures may be formed of, for example, paper products, such as chipboard, polymeric materials, metals, glues, or combinations thereof. The configuration of the support structure may match the contour of the pleats, the support structure may be generally continuously bonded to one of the major surfaces 4a, 4b of the filter media 4, and/or the support structure may be generally planar and generally bonded to the tips of the pleated filter media 4.

In the embodiment illustrated in FIGS. 1 and 2, the frame 6 includes a first generally planar support structure including grid like portion 6a (FIG. 1) arranged along and bonded to the first major surface 4a of the filter media 4, and includes a metal grid 6b (FIG. 2) arranged along the second major surface 4b of the filter media. In the illustrated embodiment, the metal grid 6b follows the contour of the pleats. In other embodiments, the metal grid 6b may be generally planar and attached to the pleat tips. The support structure serves to add strength to the frame 6 and retain the shape of the pleats. During use, the support structure is typically positioned downstream of the air flow when the filter 2 is positioned across an air duct.

In some embodiments, the filter 2 has a thickness, or depth, of less than about 1.5 inches, less than about 1.25 inches, or less than about 1 inch. That is, the filter 2 is relatively thin, and is not a so called "deep pleat" filter, which are available in nominal thicknesses of greater than 1.5 inches, for example, standard 2 inch or 4 inch sizes, which correspond to actual thicknesses of approximately 1.75 inches or 3.5 inches, respectively. Thus, in one aspect, the filter 2 of the present disclosure is generally directed to standard one inch filters, which have a nominal depth of one inch, and have an actual thickness of about ¾ inch to about ⅞ inch. As used herein, the filter depth may refer to the thickness of the frame, or to the orthogonal distance between two imaginary planes defined by the pleat tips of the opposed first and second major surfaces of the filter 2.

In some embodiments, the filter 2 has an initial pressure drop of no greater than about 0.36 inches of water pressure, about 0.34 inches of water, or about 0.32 inches of water as measured according to ASHRAE 52.2-2007 at a face velocity of 1.5 meters per second.

In some embodiments, the filter 2 has an initial E1 particle removal efficiency as measured according to ASHRAE 52.2-2007 of at least about 10%, at least about 15%, or at least about 20%.

In some embodiments, the filter media 4 has a media butane removal capacity of at least about 0.2 grams per square meter (g/m² or gsm), at least about 0.4 g/m², or at least about 0.6 g/m² when measured according to the following technique.

Media butane removal capacity is determined using a 3.25 inch diameter (0.00535 m²) exposed circle of flat filter media. 245 liters/minute (lpm) of air humidified to 50% relative humidity and containing 3.2 parts per million by volume n-butane is passed through the filter media. Filters are tested as-is, that is without a conditioning step. The 3.2 parts per million concentration of n-butane may be achieved by calibrating a mass flow controller to 3.02 mL/min flow (at ambient temperature and pressure) with dry nitrogen and using a K-factor for the nitrogen/butane pair of 0.263 to verify that 0.79 mL/min of pure butane is delivered to the system when the mass flow controller is connected to a source of pure n-butane. For the temperature and pressure in use, a specific molar volume of 24.9 L/mol may be used for the calculations. This yields a butane delivery rate of 1.85 mg/min using a molecular weight of 58.12 g/mol for n-butane. An M4001 FTIR spectrometer (available from Midac Corporation, Irvine, Calif.) equipped with a liquid nitrogen cooled MCT detector and a gas cell approximately 10 meters in path length was used to collect the data for the n-butane peak at approximately 2965 cm$^{-1}$, and the concentration of n-butane passing through the filter sample may be linearly interpolated as the difference between the peak height between a full 3.2 ppm butane challenge and a zero ppm butane challenge. The media butane removal capacity is determined by integrating the area under the efficiency curve from the start of the test until the filter sample passes through 5% efficiency. Those skilled in the art will appreciate that various suitable analytical techniques are available for measuring butane in this concentration range.

Figure 4:
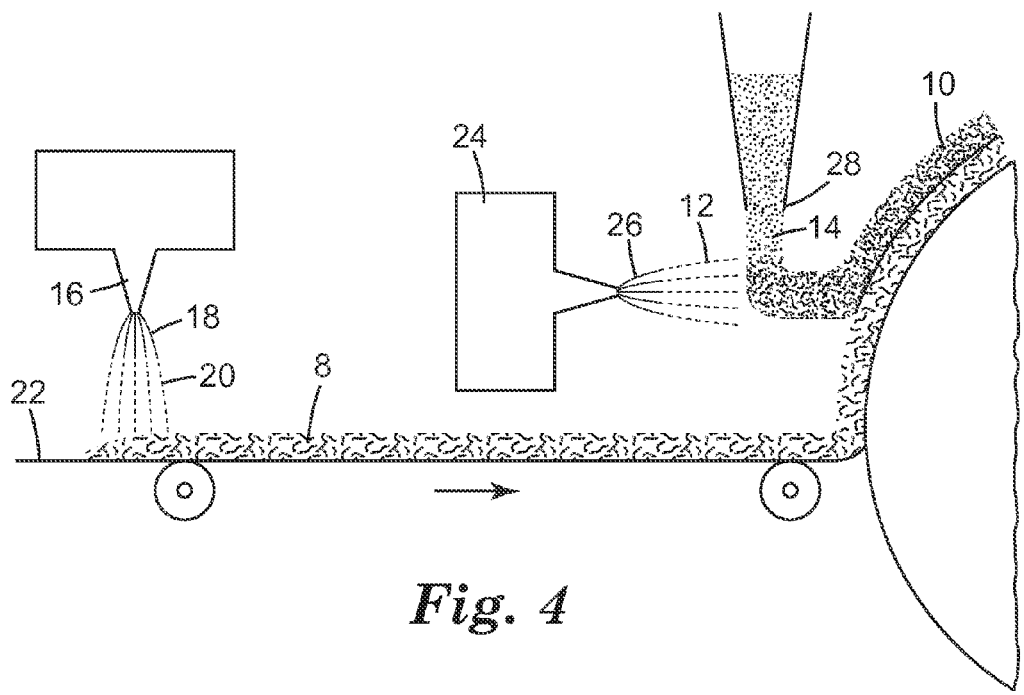
FIG. 4 is a diagrammatic illustration of a method of making the air filter media of FIG. 3.

Referring now to FIG. 4, there is illustrated a method and apparatus for making the filter media 4. In the illustrated embodiment, the base layer 8 is formed by extruding molten fiber forming polymeric material from a first die 16 to form filaments 18 that are attenuated, for example by air, into fibers 20 that are collected on a collector surface 22. In one embodiment, the fibers 18 are formed by a die 16 that has at least one orifice of a first size and at least one orifice of a second size, and further wherein the size of the first orifice is at least 25% larger than the size of the second orifice. In this manner, a nonwoven base layer 8 having a bimodal distribution of fibers may be formed. Once formed, the nonwoven base layer 8 may undergo further processing, such as electrostatic charging, according to known techniques.

The sorbent layer 10 is formed by extruding molten fiber forming polymeric material from a second die 24 to form filaments 26 that are attenuated into adhesive fibers 12. Meanwhile, sorbent particles 14 exit a chute 28 and are directed into the stream of adhesive filaments and fibers 12.

The mixture of adhesive fibers 12 and sorbent particles 14 lands on the previously formed nonwoven base layer 8, thereby forming the filter media 4. The filter media 4 may then undergo further processing such as pleating, slitting, and framing according to known techniques.

In one embodiment, the filter media may be provided with a fibrous nonwoven cover layer (not shown). Such a cover layer may be provided for aesthetic reasons and/or to aid in retaining sorbent particles 14 that may become dislodged from the adhesive fibers 12 during processing and/or during the life of the filter 2. The cover layer may also impart strength or stiffness, which may aid in the forming or retention of a pleated shape. The cover layer may also impart particle removal efficiency if the sorbent layer was deposited onto a structure-imparting base layer.

In order that the invention described herein can be more fully understood, the following examples are set forth. It should be understood that these examples are for illustrative purposes only, and are not to be construed as limiting this invention in any manner.

EXAMPLES

Effective Fiber Diameter, % Penetration, Pressure Drop, Quality Factor, Initial E1 Particle Removal Efficiency, Media Butane Removal Capacity, Thickness, Pleat Spacing, and Pleat Length were determined using the techniques described below.

Effective Fiber Diameter

The Effective Fiber Diameter (EFD) of a web was evaluated according to the method set forth in Davies, C. N., 'The Separation of Airborne Dust and Particles,' Institution of Mechanical Engineers, London, Proceedings 1B, 1952. The test was run at a face velocity of 14 cm/sec.

% Penetration, Pressure Drop, and Quality Factor

Percent penetration, pressure drop and the filtration Quality Factor (QF) of a web sample (i.e. the base layer or the filtration media) were determined using a challenge aerosol containing DOP (dioctyl phthalate) liquid droplets, delivered at a flow rate of 85 liters/min to provide a face velocity of 14 cm/s, and evaluated using a TSI™ Model 8130 high-speed automated filter tester (commercially available from TSI Inc., Shoreview, Minn.). For DOP testing, the aerosol may contain particles with a diameter of about 0.185 μm, and the automated filter tester may be operated with the heater off and the particle neutralizer on. Calibrated photometers may be employed at the filter inlet and outlet to measure the particle concentration and the % particle penetration through the filter. An MKS pressure transducer (commercially available from MKS Instruments, Andover, Mass.) was employed to measure pressure drop (ΔP, mm H$_2$O) through the filter.

The following equation was used to calculate QF:

$$QF = \frac{-\ln\left(\frac{\% \text{ Particle Penetration}}{100}\right)}{\Delta P}$$

The initial Quality Factor QF value usually provides a reliable indicator of overall performance, with higher initial QF values indicating better filtration performance and lower initial QF values indicating reduced filtration performance. Units of QF are inverse pressure drop (reported in 1/mm H$_2$O).

Initial E1 Particle Removal Efficiency

Filtration properties of a filter were determined by testing as described in ASHRAE Standard 52.2-2007 ("Method of Testing General Ventilation Air-Cleaning Devices for Removal Efficiency by Particle Size"). The test involves configuring the web as a filter (e.g., a pleated and/or framed filter), installing the filter into a test duct and subjecting the filter to potassium chloride particles that have been dried and charge-neutralized. A test face velocity of 1.5 meters/sec was used. An optical particle counter was used to measure the concentration of particles upstream and downstream from the test filter over a series of twelve particle size ranges or channels. The following equation was used to calculate the particle removal efficiency for each channel:

$$\text{Capture efficiency (\%)} = \frac{\text{upstream particle count} - \text{downstream particle count}}{\text{upstream particle count}} \times 100$$

Pressure drop across the filter was measured. From the initial efficiency curve, the four efficiency values between 0.3 and 1.0 µm were averaged to provide the E1 initial efficiency.

Media Butane Removal Capacity

Media butane removal capacity was determined using a 3.25 inch diameter (0.00535 m$^2$) exposed circle of flat filter media. 245 liters/minute (lpm) of air humidified to 50% relative humidity and containing 3.2 parts per million by volume n-butane was passed through the filter media. Filters were tested as-is, that is, without a conditioning step. The 3.2 parts per million concentration of n-butane was achieved by calibrating a mass flow controller to 3.02 mL/min flow (at ambient temperature and pressure) with dry nitrogen and using a K-factor for the nitrogen/butane pair of 0.263 to verify that 0.79 mL/min of pure butane was delivered to the system when the mass flow controller is connected to a source of pure n-butane. For the temperature and pressure in use, a specific molar volume of 24.9 L/mol was used for the calculations. This yielded a butane delivery rate of 1.85 mg/min using a molecular weight of 58.12 g/mol for n-butane. An M4001 FTIR spectrometer (available from Midac Corporation, Irvine, Calif.) equipped with a liquid nitrogen cooled MCT detector and a gas cell approximately 10 meters in path length was used to collect the data for the n-butane peak at approximately 2965 cm$^{-1}$, and the concentration of n-butane passing through the filter sample was linearly interpolated as the difference between the peak height between a full 3.2 ppm butane challenge and a zero ppm butane challenge. The media butane removal capacity was determined by integrating the area under the efficiency curve from the start of the test until the filter sample passed through 5% efficiency.

Thickness

Thickness of the base layer web was measured by obtaining (e.g., by die cutting) a 135 mm diameter disk of the web and measuring the web thickness with a 140 g weight of 102 mm diameter centered atop the web.

Pleat Spacing

To determine the average spacing of pleats in a filter, the number of pleats in the filter were counted and divided by the nominal dimension (i.e. advertised dimension) of the filter in the machine direction (i.e. perpendicular to the pleats). The pleat spacing may be reported as pleats per inch, pleats per foot, centimeters per pleat, etc.

Pleat Length

To determine the average length of pleats in a filter, the frame of the filter and any frame cross-hatches, wire, or other supporting members must be relieved to allow the pleats to be unfolded. The pleats were unfolded on a flat surface and placed under tension sufficient to flatten without stretching the media, and a minimum of five full pleats were measured. Average pleat length equals the total length divided by the number of pleats. Pleat length may be reported in any length units, for example, inches or centimeters.

Examples 1-7

Two nonwoven base layer materials were used to prepare samples of the invention. The first base layer material, B1, is available under the trade name of Filtrete GDU-60, from 3M Company, St. Paul, Minn.

The second web base layer material, B2, was formed on a meltblowing apparatus as shown in FIG. 1 of U.S. Pat. No. 6,858,297 (Shah et al.) using a die tip as shown in FIG. 3 of U.S. Patent Publication No. 2008/0026659 (Brandner et al.).

The second base layer web, B2, was formed from FINA 3860 polypropylene having a melt flow rate index of 70 available from Total Petrochemicals, Houston, Tex., combined with 0.8% by weight CHIMASSORB 944 available from Ciba Specialty Chemicals, now part of BASF, Florham Park, N.J., and 1.2% by weight DX820 polymethylpentene available from Mitsui Chemicals America, Rye Brook, N.Y.

The raw materials were provided to the die at a melt temperature of 308° C. and a throughput rate of 703 g/cm/hr. The die contained nine small orifices of 0.30 mm diameter for every one large orifice of 0.64 mm diameter with a spacing of 9.8 orifices per cm. Hot air at 296° C. was provided at a pressure of 18 kPa across an air knife gap of 0.76 mm. The collector distance was 80 cm, and the collector vacuum was 900 Pa. Manifolds as described in U.S. Patent Publication No. 2006/0265169 (Breister et al.) were employed, and quench air was provided at a temperature of 9° C. and a flow rate of approximately 28 m$^3$/hr/cm.

The collected web was hydrocharged with deionized water according to the technique taught in U.S. Pat. No. 5,496,507 (Angadjivand et al.).

The flat base layer webs B1 and B2 were evaluated, and the results are reported in Table 1A.

TABLE 1A

| Property | Units | B1 | B2 |
|---|---|---|---|
| Basis weight | g/m$^2$ | 70 | 102 |
| Thickness | mm | 1.61 | 1.85 |
| Pressure drop at 14 cm/s | mm H$_2$O | 0.44 | 0.41 |
| Effective fiber diameter (EFD) | µm | 25 | 34 |
| % Penetration DOP at 14 cm/s | | 37 | 65 |
| Quality factor | 1/mm H$_2$O | 2.25 | 1.05 |

A web of filtration media was formed by preparing and depositing an admixture of adhesive fibers and sorbent particles onto the base layer materials B1 and B2, described above, using an apparatus as shown in FIG. 6 of U.S. Patent Publication No. 2006/0096911 (Brey, et al.). The adhesive fibers were formed of Vistamaxx 2125 specialty elastomer available from ExxonMobil Chemical Company, Houston, Tex. The die tip consisted of uniform diameter orifices with 9.8 orifices/cm spacing. The die to collector distance was 17 cm, and no collector vacuum was used. Hot air was provided to the die across air knives with a gap of 0.76 mm. Granular activated carbon provided by Kuraray Chemical Company, Canoga Park, Calif., was gravity fed in the vertical orientation to a horizontally oriented airstream. The exit of the carbon chute was placed near the outlet of the meltblown die in both the vertical and horizontal dimensions. Additional process conditions are described in Table 1B. Example 6 used base layer B1, while Examples 1-5 and 7 used base layer B2.

TABLE 1B

| Property | Units | Ex 1 | Ex 2 | Ex 3 | Ex 4 | Ex 5 | Ex 6 | Ex 7 |
| --- | --- | --- | --- | --- | --- | --- | --- | --- |
| Polymer melt temperature | °C. | 266 | 273 | 266 | 275 | 276 | 273 | 266 |
| Die air pressure | kPa | 7 | 9 | 7 | 7 | 7 | 9 | 7 |
| Die air temperature | °C. | 282 | 284 | 279 | 279 | 280 | 284 | 282 |
| Carbon grade | N/A | GG 25 × 45 CTC 80 | GG 25 × 45 CTC 80 | GC 12 × 20 CTC 90 | GC 12 × 20 CTC 90 | GC 12 × 20 CTC 90 | GC 12 × 20 CTC 90 | GG 30 × 60 CTC 60 |
| Polymer feed rate | g/cm/hr | 419 | 253 | 419 | 253 | 253 | 253 | 253 |
| Carbon feed rate | g/cm/hr | 3040 | 2660 | 2546 | 2546 | 2546 | 2470 | 2945 |

The properties of the flat filtration media webs formed (i.e. the base layer with the admixture of adhesive fibers and sorbent particles) were then measured. The results are reported in Table 1C.

TABLE 1C

| Property | Units | Ex 1 | Ex 2 | Ex 3 | Ex 4 | Ex 5 | Ex 6 | Ex 7 |
| --- | --- | --- | --- | --- | --- | --- | --- | --- |
| Total basis weight* | g/m$^2$ | 404 | 387 | 385 | 385 | 542 | 340 | 394 |
| Adhesive fibers basis weight | g/m$^2$ | 45 | 27 | 44 | 27 | 44 | 27 | 27 |
| Adhesive % sorption layer | % | 15.1 | 9.5 | 15.8 | 9.6 | 10.1 | 9.9 | 9.3 |
| Sorbent particles basis weight | g/m$^2$ | 254 | 256 | 236 | 253 | 393 | 243 | 262 |
| Pressure drop at 14 cm/s | mm H$_2$O | 0.63 | 0.67 | 0.51 | 0.51 | 0.54 | 0.63 | 0.79 |

*The total basis weight is the combined total basis weight of the base layer and the basis weight of the sorbent layer (i.e. basis weight of the adhesive fibers + basis weight of sorbent particles).

The filtration media was also tested for media butane removal capacity. Two samples for each example were tested and averaged unless otherwise noted. Filter media samples were laminated to open wire mesh reinforcement with either Super 77 Spray Adhesive available from 3M Company or hot melt adhesive. The laminated media was pleated and framed into filters with a one-piece die cut frame to provide a final nominal filter dimension of 20×25×1 inch or 16×25×1 inch. The initial pressure drop and initial efficiency of each filter was measured according to the ASHRAE 52.2-2007 standard at a velocity of 1.5 m/s. Table 1D summarizes the media butane removal capacity as well as the filter pressure drop and efficiency values.

TABLE 1D

| Ex # | Ex 1 | Ex 2 | Ex 3 | Ex 4* | Ex 5 | Ex 6 | Ex 7 |
| --- | --- | --- | --- | --- | --- | --- | --- |
| Nominal filter size (inches) | 20 × 25 × 1 | 20 × 25 × 1 | 16 × 25 × 1 | 20 × 25 × 1 | 20 × 25 × 1 | 20 × 25 × 1 | 20 × 25 × 1 |
| Pleat spacing (cm) | 2.0 | 2.2 | 2.0 | 2.0 | 2.3 | 2.4 | 2.1 |
| Pleat length (cm) | 5.3 | 5.8 | 5.1 | 5.3 | 5.8 | 5.8 | 5.8 |
| Pressure drop (inches of H2O) | 0.25 | 0.23 | 0.24 | 0.21 | 0.31 | 0.27 | 0.28 |
| E1 Initial Efficiency (0.3-1.0 μm) | 29.3 | 27.0 | 32.3 | 27.1 | 32.5 | 51.2 | 29.6 |
| Media butane removal capacity (g/m$^2$) | 1.18 | 1.05 | 0.85 | 0.5 | 1.80 | 0.83 | 2.23 |

*three samples averaged for Ex 4.

Competitive Examples 1-13

Comparative Examples 1-13 were performed using commercially available pleated HVAC filters containing sorbent particles. The manufacturer, manufacturer's location, filter model, and filter size for each of the comparative examples are set forth in Table 2A below.

TABLE 2A

| | Manufacturer | Address | Model | Size (inches) |
|---|---|---|---|---|
| C1 | RPS Products | Hampshire, IL | BestAir Odors & Allergens Air Cleaning Filter | 20 × 25 × 1 |
| C2 | Glasfloss Industries | Dallas, TX | Z-line Series Carbotron | 20 × 25 × 1 |
| C3 | Air Filters, Inc. | Houston, TX | Astro Pleat Astrosorb | 20 × 25 × 1 |
| C4 | Koch Filter Corporation | Louisville, KY | OdorKleen ES | 20 × 20 × 1 |
| C5 | Air Filters, Inc. | Houston, TX | Astro Pleat ODRX | 20 × 25 × 1 |
| C6 | Tri-Dim Filter Corporation | Louisa, VA | Tri-Sorb XL | 20 × 20 × 1 |
| C7 | CLARCOR Air Filtration Products | Louisville, KY | Purolator Hi-E 40 CB | 20 × 20 × 1 |
| C8 | CLARCOR Air Filtration Products | Jeffersonville, IN | AirGuard Fresh Air FA-104 | 20 × 25 × 1 |
| C9 | AAF International | Louisville, KY | AmAir/C-1 | 20 × 25 × 1 |
| C10 | Filtration Group | Joliet, IL | Series 550 Odor Removal Pleat | 20 × 25 × 1 |
| C11 | AAF International | Louisville, KY | Amair/C-E | 20 × 25 × 1 |
| C12 | D-Mark | Chesterfield, MI | OdorGuard CW 25 Pleat | 20 × 25 × 1 |
| C13 | Flanders Corporation | Washington, NC | Pre Pleat 40 | 20 × 25 × 1 |

The filters were evaluated and the results are reported in Table 2B below.

TABLE 2B

| Ex # | Pleat spacing, cm | Pleat length, cm | Pressure drop, in H2O | E1 Initial Efficiency (0.3-1.0 μm) | Media butane removal capacity, gsm |
|---|---|---|---|---|---|
| C1 | 2.5 | 4.8 | 0.26 | 22.6 | 0.07 |
| C2 | 1.9 | 4.4 | 0.16 | 16.8 | 0.02 |
| C3 | 2.0 | 4.1 | 0.16 | 6.9 | 0.05 |
| C4 | 2.7 | 4.9 | 0.34 | 15.7 | 0.01 |
| C5 | 2.3 | 4.1 | 0.32 | 16.4 | 0.03 |
| C6 | 2.0 | 3.9 | 0.49 | 23.4 | 0.60 |
| C7* | 2.5 | 4.2 | 0.58 | 24.3 | 0.57 |
| C8 | 2.7 | 3.8 | 0.53 | 18.9 | 0.42 |
| C9** | 2.1 | 4.3 | 0.51 | 8.7 | 4.91 |
| C10 | 2.5 | 4.7 | 0.38 | 14.9 | 0.67 |
| C11*** | 2.7 | 5.1 | 0.16 | 2.6 | 0.09 |
| C12 | 2.7 | 5.1 | 0.19 | 1.0 | 0.89 |
| C13 | 2.5 | 4.6 | 0.13 | 4.0 | 0.01 |

*one sample was run for C7.
**both samples for C9 media butane removal capacity were terminated prior to reaching the 5% end of test threshold.
***three samples were averaged for the C11 media butane removal capacity.

Persons of ordinary skill in the art may appreciate that various changes and modifications may be made to the invention described above without deviating from the inventive concept. Thus, the scope of the present invention should not be limited to the structures described in this application, but only by the structures described by the language of the claims and the equivalents of those structures.

What is claimed is:

1. An air filter for use in a residential HVAC system, comprising:
   (a) filtration media having opposed first and second major surfaces and a perimeter edge region, the filter media including:
      (i) a nonwoven base layer; and
      (ii) a sorbent layer including adhesive fibers and from about 100 to about 500 $g/m^2$ of sorbent particles comprising granular activated carbon; wherein the adhesive fibers have a ratio of length to diameter of at least about 10,000 or more and are present in an amount of between about 2 wt % and about 20 wt %; and wherein the adhesive fibers bond and adhere to the sorbent particles and bond and adhere the sorbent layer to the nonwoven base layer; and
   (b) a frame arranged around at least a portion of the perimeter edge region of the media.

2. A filter as defined in claim 1, wherein the filtration media is pleated.

3. A filter as defined in claim 1, wherein the sorbent layer has a basis weight of about 100 $g/m^2$ to about 625 $g/m^2$.

4. A filter as defined in claim 2, further comprising a support structure attached to at least one of the first and second major surfaces.

5. A filter as defined in claim 4, wherein the support structure is a wire mesh.

6. A filter as defined in claim 5, wherein the wire mesh is planar.

7. A filter as defined in claim 5, wherein the wire mesh follows a contour of the pleated filtration media.

8. A filter as defined in claim 1, wherein the nonwoven base layer includes a first plurality of fibers of a first size and a second plurality of fibers of a second size, and further wherein the first size is at least 25% larger than the second size.

9. A filter as defined in claim 1, wherein the nonwoven base layer comprises electrostatically charged fibers.

10. A filter as defined in claim 9, wherein the nonwoven base layer has a basis weight of about 20 $g/m^2$ to about 150 $g/m^2$.

11. A filter as defined in claim 1, wherein the filter has a media butane removal capacity of at least about 0.2 $g/m^2$ when measured according to the test method described in the specification.

12. The air filter of claim 1, comprising:
   (i) a thickness of no greater than about 1.5 inches,
   (ii) an initial pressure drop of no greater than about 0.32 inches of water pressure as measured according to ASHRAE 52.2-2007 at a face velocity of 1.5 meters per second, and (iii) an initial E1 particle removal efficiency as measured according to ASHRAE 52.2-2007 of at least about 10%.

13. An air filter as defined in claim 12, having a media butane removal capacity of at least about 0.2 g/m² when measured according to the test method described in the specification.

14. An air filter as defined in claim 1, wherein the adhesive fibers are meltblown.

15. An air filter as defined in claim 1, wherein the adhesive fibers have greater elasticity than polypropylene fibers having the same caliper.

16. An air filter as defined in claim 1, wherein the adhesive fibers comprise polyolefin copolymers.

* * * * *